INVENTOR.
RALPH G. CROMLEIGH

BY Francis A. Varallo
AGENT

| | | MAGNETIC CORES | 10 | 11 | 12 | 13 | 14 | 15 | 16 | 17 | 18 | 19 | 20 |
|---|---|---|---|---|---|---|---|---|---|---|---|---|---|
| | | STORED INFORMATION | 1 | 0 | 0 | 0 | 1 | 0 | 0 | 0 | 0 | 1 | 0 |
| FIRST SUBTRACT CYCLE | A | $t_1$ | 0 | 1 | 0 | 0 | 0 | 1 | 0 | 0 | 0 | 0 | 1 |
| | | $t_2$ | 1 | 0 | 1 | 0 | 0 | 0 | 1 | 0 | 0 | 1 | 0 |
| | B | $t_1$ | 0 | 1 | 0 | 1 | 0 | 0 | 0 | 0 | 0 | 0 | 0 |
| | | $t_2$ | 0 | 0 | 1 | 0 | 1 | 0 | 0 | 0 | 0 | 0 | 0 |
| | C | $t_1$,s | 0 | 0 | 0 | 1 | 0 | 1 | 0 | 0 | 1 | 0 | 0 |
| | | $t_2$ | 0 | 0 | 0 | 0 | 1 | 0 | 1 | 0 | 1 | 0 | 0 |
| | N | $t_1$ | 0 | 0 | 0 | 0 | 0 | 1 | 0 | 1 | 1 | 0 | 0 |
| | | $t_2$,$m_{2'}$ | 1 | 0 | 0 | 0 | 0 | 0 | 1 | 0 | 0 | 1 | 0 |
| SECOND SUBTRACT CYCLE | A' | $t_1$ | 0 | 1 | 0 | 0 | 0 | 0 | 0 | 0 | 0 | 0 | 0 |
| | | $t_2$ | 0 | 0 | 1 | 0 | 0 | 0 | 0 | 0 | 0 | 0 | 0 |
| | B' | $t_1$,s | 0 | 0 | 0 | 1 | 0 | 0 | 0 | 0 | 1 | 0 | 0 |
| | | $t_2$ | 0 | 0 | 0 | 0 | 1 | 0 | 0 | 0 | 1 | 0 | 0 |
| | C' | $t_1$ | 0 | 0 | 0 | 0 | 0 | 1 | 0 | 0 | 1 | 0 | 0 |
| | | $t_2$ | 0 | 0 | 0 | 0 | 0 | 0 | 1 | 0 | 1 | 0 | 0 |
| | N' | $t_1$ | 0 | 0 | 0 | 0 | 0 | 0 | 0 | 1 | 1 | 0 | 0 |
| | | $t_2$,$m_{2'}$ | 1 | 0 | 0 | 0 | 0 | 0 | 0 | 0 | 0 | 1 | 0 |
| THIRD SUBTRACT CYCLE | A'' | $t_1$ | 0 | 1 | 0 | 0 | 0 | 0 | 0 | 0 | 0 | 0 | 1 |
| | | $t_2$ | 1 | 0 | 1 | 0 | 0 | 0 | 0 | 0 | 0 | 1 | 0 |
| | B'' | $t_1$ | 0 | 1 | 0 | 1 | 0 | 0 | 0 | 0 | 0 | 0 | 1 |
| | | $t_2$ | 1 | 0 | 1 | 0 | 1 | 0 | 0 | 0 | 0 | 1 | 0 |
| | C'' | $t_1$ | 0 | 1 | 0 | 1 | 0 | 1 | 0 | 0 | 0 | 0 | 1 |
| | | $t_2$ | 1 | 0 | 1 | 0 | 1 | 0 | 1 | 0 | 0 | 1 | 0 |
| | N'' | $t_1$ | 0 | 1 | 0 | 1 | 0 | 1 | 0 | 0 | 0 | 0 | 0 |
| | | $t_2$ | 0 | 0 | 1 | 0 | 1 | 0 | 1 | 0 | 0 | 0 | 0 |

Fig. 2

INVENTOR.
RALPH G. CROMLEIGH
BY Francis A. Varallo
AGENT

United States Patent Office 2,956,745

Patented Oct. 18, 1960

2,956,745

SUBTRACT COUNTER

Ralph G. Cromleigh, Altadena, Calif., assignor to Burroughs Corporation, Detroit, Mich., a corporation of Michigan Filed Sept. 29, 1958, Ser. No. 763,966

6 Claims. (Cl. 235—92)

This invention relates to electronic counting circuits and more particularly to counters which employ bistable magnetic storage elements in a novel and efficient manner.

Shift registers employing magnetic elements for the storage of binary information are well known in the art, as evidenced by articles such as "An Electronic Digital Computer," written by A. D. Booth, and published in Electronic Engineering for December 1950. A variety of counting circuits have been devised using magnetic storage elements in accordance with the shift register principles disclosed in said article.

In a magnetic serial shift register the stored information must be read out of one element before a further bit of information can be stored therein. Therefore a delay is required in shifting the stored signal from one magnetic element to the next. This delay may be realized by inserting a temporary storage element as an idler core between two storage elements. This principle is employed in a known counter circuit where, in order to count the number N, N pairs of magnetic elements are connected in a ring. The output from the last stage of the shift register is fed back to the first stage. Each pair of elements includes a count element and an intermediate storage element. Count signals and shift pulses are applied alternately to the count elements and intermediate storage elements respectively, to advance a single reference bit of information along the ring. An output pulse is available from a selected count element every Nth counth signal.

Conventional counter circuits constructed as hereinbefore described, are inefficient and uneconomical for relatively large count-downs because of the number of magnetic elements required. If it is desired to increase the count from N to twice N, it is necessary to double the number of pairs of magnetic elements already in the counter. As will become apparent from the description of the instant invention which follows, the count may be doubled by adding one stage to the counter, or a maximum of two storage elements.

This invention relates to a counter circuit in which the output of the last stage of a shift register is coupled to the first stage by means of a modifying network which may include one or more of the shift register stages in combination with additional magnetic elements.

In accordance with the instant invention, the bits of information preset in the shift register represent a binary number comprising a most significant digit, a least significant digit, and as many intermediate digits as are provided by the stages of the shift register section of the counter. This number will circulate unchanged in the shift register in response to the advance pulses applied to the magnetic elements of the register. The algorithm for subtracting "one" from a binary number is to complement each digit starting with the least significant digit and stopping with the first "1." The application of an input count pulse to the modifying network conditions the network to subtract "one" from the binary number in the register, and the new number circulates until it is modified in like manner by a subsequent input count pulse.

Thus "one" is subtracted from the binary number preset in the register each time an input count pulse occurs. Circuit means are provided to give an output indication when the desired count is attained. For example, the absence of information in the register may serve as an indication that the preset number has been counted-down to "zero" by an equal number of input pulses applied to the modifying network. Sensing means responsive to the absence of information in the register may be employed to deliver an output pulse to a utilization device and/or reset the counter to any desired number. In some applications it is advantageous to sense the presence of a predetermined number in the register rather than the absence of a number as hereinbefore suggested.

It is a general object of the present invention to provide an improved counter circuit utilizing bistable magnetic storage elements.

A more specific object of this invention is to provide a high speed counter circuit for producing large count-downs which is economical with respect to the number of storage elements employed therein.

Another object of the invention is to provide a counter having increased versatility by virtue of its ability to provide any count that does not exceed the largest binary number which can be stored and circulated therein.

A further object of this invention is to provide a counter circuit which counts only on command of an external count pulse applied thereto.

A still further object of this invention is to provide a counter circuit which functions by subtracting "one" from the binary number preset therein whenever a count pulse is applied thereto.

Other features and objects of the invention will be described through the following detailed description of the invention, and illustrated in the accompanying drawings, in which:

Fig. 2 depicts in tabular form the magnetic remanent states of the cores in the shift register and modifying network portions of the counter circuit for each time step in three successive subtract cycles.

Figure 1:
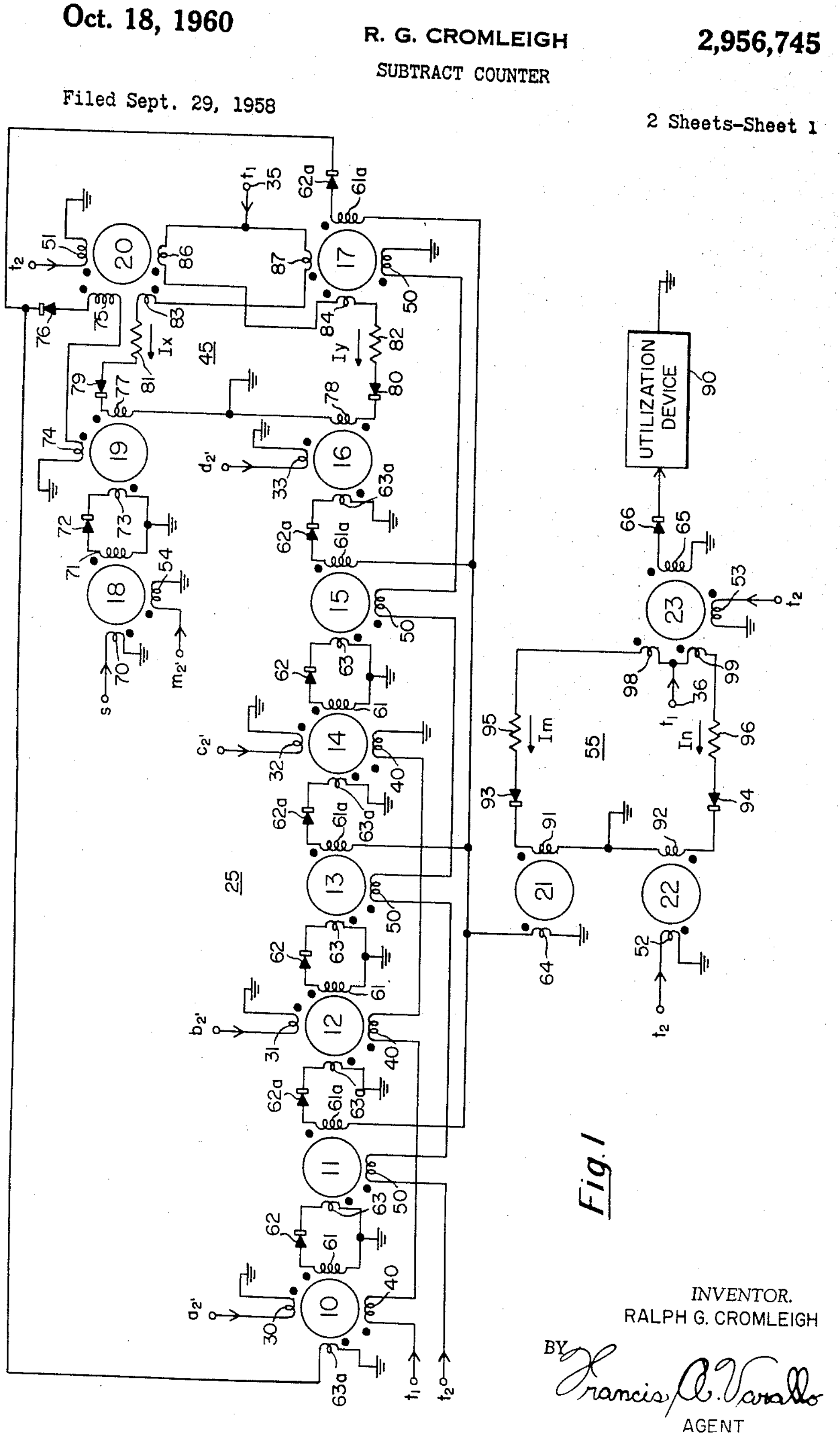
Fig. 1 is a schematic diagram illustrating an embodiment of the instant counter circuit.

Before proceeding with a detailed analysis of the circuit, it will be helpful to review the notation and background material used in connection with the schematic diagram. Information of opposite polarities to be stored in the binary elements is arbitrarily designated in the binary notation "1" and "0." Magnetic binary elements are shown as circles and it is assumed that these circles represent magnetic cores having essentially rectangular hysteresis loop characteristics. Although the magnetic elements are depicted herein as being toroidal in form, it is understood that the invention is not limited to elements of this particular geometry, but may include other forms of magnetic storage elements.

Each of the magnetic cores is supplied with windings for producing a magnetic flux therein in response to current flow through these windings. A dot is placed at the end of each of these windings to indicate that that end has a negative polarity during read-in of a binary "1" and a positive polarity during read-out of a binary "1." Thus as current flows into the dotted winding terminal the core associated with such winding will tend to store a "0." Conversely, if current flows into an undotted winding terminal, the core associated with such winding will tend to store a "1." The windings coupled to the magnetic cores of Fig. 1 have been depicted with one, two and three turns in order to distinguish their function as input, advance or interrogation, and output respectively.

The signals, storage conditions and currents are designated by appropriate letters supplied with subscript numbers which designate a relative time step. Conditional pulses are represented by letters "*a, b, c,*" etc. The time at which these pulses occur in a cycle is indicated by a subscript, the sequence in time corresponding to the sequence of the subscript. Unconditional pulses are represented by the letter "*t*," followed by a subscript representing the time indication.

Referring to Fig. 1, magnetic cores 10 through 17 inclusive, and their associated transfer circuits comprise a four stage re-entrant shift register 25. Each of the even-numbered cores, with the exception of core 16, is coupled to the succeeding odd-numbered core by a transfer loop consisting of the series circuit arrangement of an output winding 61, diode 62, and an input winding 63. The odd-numbered cores are coupled to the succeeding even-numbered cores by transfer loop circuits, each comprising the series arrangement of output winding **61*a*, diode 62*a*, and input winding 63*a*; and all of said latter transfer circuits having a common winding 64 coupled to magnetic core 21**.

Depending upon the count desired, a binary number is preset in the shift register by applying the proper combination of pulses $a_{2'}$, $b_{2'}$, $c_{2'}$ and $d_{2'}$ to input windings 30, 31, 32 and 33 coupled to magnetic cores 10, 12, 14 and 16 respectively. For example, if a "1" is stored in each of the even-numbered register cores, the binary number "1 1 1 1," which is equivalent to the number "fifteen," is obtained. This number represents the maximum count available from the embodiment of the invention depicted in Fig. 1. By adding an additional stage to the shift register of Fig. 1, or a total of two magnetic cores and their associated transfer circuits, the binary number "1 1 1 1 1," or "thirty-one," which is approximately double the count obtained with the former circuit, may be obtained. The odd-numbered cores 11, 13, 15 and 17 are used as idler cores for intermediate storage. The binary information stored in the even-numbered cores of the register is advanced to the odd-numbered cores by current $t_1$ flowing through windings 40. Likewise, advance current pulse $t_2$, flowing through windings 50, causes the information in the odd-numbered cores to be transferred to the even-numbered cores. The information stored in core 17, the "last" core in the register, is transferred back to the "first" core 10 in response to advance pulse $t_2$.

Magnetic cores 16 and 17 have a dual function, namely, as a stage of the shift register 25 and as part of a logical modifying network 45 in combination with magnetic cores 19 and 20. Cores 16 and 19 are the input, and 17 and 20 are the output cores of the network 45 which functions substantially as a double-inhibit, or EXCLUSIVE OR circuit. The latter circuit is described and claimed in copending application of Albert J. Meyerhoff, Serial No. 759,775, now Patent No. 2,925,500, filed September 8, 1958, which is a division of application Serial No. 479,061, now Patent No. 2,861,259, filed December 31, 1954, in the name of Albert J. Meyerhoff, both of which have been assigned to the same assignee as the instant application. Briefly, the presence of a binary "1" in core 19 when current pulse $t_1$ is applied to terminal 35, will inhibit the transfer of a binary "1" from core 16 to core 17; similarly, the presence of a "1" in core 16 will inhibit the transfer of a "1" from core 19 to core 20. The operation of the modifying network will become apparent in the detailed description of the counter circuit which follows. Windings 77 and 78 are interrogation windings coupled to cores 19 and 16 respectively. Cores 17 and 20 each have a pair of input windings 84, 87, and 83, 86, coupled respectively thereto. Diodes 79 and 80 prevent the flow of current around the modifying network loop when information is read into cores 16 and 19. Resistors 81 and 82 serve to compensate for slight differences in static circuit impedance which may exist between the upper and lower halves of the network 45.

A subtract count pulse "*s*" may be stored in core 18 by pulsing winding 70 coupled thereto. Core 18 may be read out by applying pulse $m_{2'}$, to winding 54 of core 18 and the count pulse is shifted to core 19 by way of a transfer circuit comprising the series combination of output winding 71, diode 72, and input winding 73. If core 16 is in the "0" state, and core 19 is in the "1" state as a result of the transfer of a count pulse thereto, the "1" stored in 19 will be transferred to core 20 by interrogating current pulse $t_1$ applied to terminal 35. The information in core 20 will subsequently be read out by current pulse $t_2$ applied to winding 51 and transferred simultaneously to core 10 and back to core 19 by a circuit which includes an output winding 75 coupled to core 20, diode 76 and input windings **63*a* and 74 coupled to cores 10 and 19** respectively.

The binary number circulating in the shift register at a particular time may be sensed by logical configurations of magnetic cores coupled to the shift register stages in various combinations. In the drawing of Fig. 1 magnetic cores 21, 22 and 23 and their associated components form a logical inhibit circuit 55 adapted to supply an output pulse to the utilization circuit 90 when, and only when, the binary number in the register is "0000." Said inhibit circuit is described and claimed in the aforementioned Patent No. 2,861,259. Cores 21 and 22 are input cores, and core 23 is an output core of the inhibit circuit. An output pulse is stored in core 23 whenever core 21 is in the "0" state and core 22 is in the "1" state at the time interropulse $t_1$ is applied to terminal 36 of the sensing circuit. As hereinbefore mentioned, input winding 64 coupled to magnetic core 21 is connected in common to all of the shift register transfer loop circuits which couple the odd-numbered cores to the even-numbered cores. The transfer of a binary "1" by advance pulse $t_2$ from any of the odd-numbered cores to the even-numbered cores of the register, also stores a "1" in core 21. Core 22 is unconditionally preset to the "1" state by $t_2$ pulse flowing through winding 52. The operation of the inhibit circuit 55 will hereinafter be explained in greater detail in connection with the over-all counter operation. Interrogation windings 91 and 92 are coupled to cores 21 and 22 respectively. Coupled to output core 23 are two input windings 98 and 99, an interrogation winding 53 and an output winding 65. Diodes 93 and 94 prevent the circulation of current in the sensing loop during the read-in of signals into cores 21 and 22. Resistors 95 and 96 tend to compensate for any minor unbalances in the static impedances of the upper and lower halves of the sensing loop. Diode 66 is connected in series with the output winding 65 and the utilization circuit 90 to prevent the flow of current to the utilization circuit except during the switching of magnetic core 23 from the "1" state to the "0" state.

The operation of the counter circuit of Fig. 1 will be illustrated by describing how a count of "ten" is obtained. Initially all of the magnetic cores are assumed to be in the "0" remanent state. The number "ten" in binary form, i.e., "1010," is preset in the even-numbered cores of the four-stage shift register at a $t_2$ time. The most significant digit of the binary number is stored in core 10; the least significant digit in core 16. This is accomplished by causing current pulses $a_{2'}$ and $c_{2'}$ to flow through windings 30 and 32 of cores 10 and 14 respectively, thereby switching each of said latter cores to the "1" state. The absence of pulses $b_{2'}$ and $d_{2'}$ allows cores 12 and 16 to remain in the "0" state.

Some explanation is necessary for a proper understanding of the subscript 2′ associated with certain current pulses. It should be observed that since the binary number is preset in the register at a $t_2$ time, for every Nth occurrence of advance pulse $t_2$ thereafter (where N represents the number of stages in the register), the information in the respective cores will be identical to that originally preset therein, i.e., the most significant digit will be stored in core 10; the least significant in core 16. The use of the subscript 2′ indicates that the pulse associated with the subscript occurs simultaneously with an Nth occurrence of advance pulse $t_2$, or any integral multiple of N, following the preset of the register.

In response to the first $t_1$ pulse following the presetting of the binary number in the register, cores 10 and 14 will switch from their "1" states to their respective "0" states, thereby inducing a switching voltage in windings 61 associated with said latter cores and causing current to flow through input windings 63 coupled to cores 11 and 15 so as to switch each of the cores 11 and 15 from the "0" state to the "1" state. Similarly, the following advance pulse $t_2$ will cause cores 11 and 15 to switch from their "1" states to the "0" states, and the "1's" stored therein will be transferred to cores 12 and 16. This is accomplished by switching current which flows through a common winding 64, coupled to core 21 and then branches off into two parallel transfer circuits coupling cores 11 and 15 to 12 and 16 respectively. The function of winding 64 will hereinafter be considered in detail.

Thus after the first advance pulse $t_2$ following the presetting of said binary number in the register 25, cores 12 and 16 are in the "1" state; 10 and 14 in the "0" state. Since core 16 is also an input core of the modifying network, as hereinbefore mentioned, the transfer of a "1" from core 16 to core 17 is accomplished through the action of the modifying network rather than by the transfer loop circuit previously described. Interrogating current $t_1$ applied to terminal 35 of the modifying network divides into branch currents $I_x$ and $I_y$ which flow through windings 77 and 78 respectively in such a direction as to switch each of the cores 19 and 16 from the "1" state to the "0" state. In the present situation, the switching of core 16 from the "1" state provides a higher impedance to current $I_y$ than that which core 19, already in the "0" state, presents to current $I_x$. Consequently current $I_x$ is larger than current $I_y$. The switching M.M.F. applied to core 17 by current $I_x$ flowing through winding 87 is sufficient to overcome the effect of the smaller current $I_y$ flowing through winding 84, and core 17 is switched to the "1" state. Magnetic core 20, on the other hand, is driven further into the "0" state. The information in core 17 is subsequently transferred to core 10 in response to the application of current pulse $t_2$ to winding 50.

In like manner, the information in the register will be advanced from core to core in response to the application thereto of alternate advance or interrogation pulses $t_1$ and $t_2$; and will continue to circulate unchanged until a subtract count pulse is introduced into core 19 of the modifying network 45.

In the circuit embodiment of Fig. 1, the initiation of the count cycle is dependent upon the switching of core 18 to the "1" state by the application of count pulse "*s*" to input winding 70. The subscript designating the time of occurrence of "*s*" has been omitted since pulse "*s*" may occur at any time except during 2′ time when core 18 is being interrogated. It is an important operational requirement of the instant counter that the subtract count pulse be read into input core 19 at 2′ time. This is necessary because the subtraction of "one" from the binary number in the register must commence with the least significant digit and this digit occupies the input core 16 of the modifying network only at 2′ times.

The interrogation pulse applied to core 18 has been designated as conditional, i.e., $m_{2'}$. Actually, in many applications, the latter pulse may occur unconditionally at each 2′ time and may be designated $t_{2'}$. In either case, the interrogation pulse may conveniently be derived from the system logic in which the counter is employed. For example, in the present embodiment a conventional four stage ring counter may be used in which the required $t_{2'}$ pulse is derived from the output of a selected core, or alternately the output of said selected core may be gated so as to obtain the conditional $m_{2'}$ pulse only when the gate is primed to pass said pulse.

It will be apparent that in some applications the intermediate storage afforded by core 18 is an unnecessary circuit refinement. If the system operation is such that a subtract count pulse can occur only at $t_{2'}$ time, core 18 may be eliminated and the count pulse applied directly to input winding 73 of core 19.

In the table of Fig. 2 the magnetic remanent states of the cores 10 through 20 inclusive, listed in each row are those resulting from the application of the current pulse or pulses shown adjacent to said rows. The letters A, B, C and N represent time intervals in a complete cycle for subtracting "one" from the number in the register. Each time interval consists of two time steps designated by subscript numbers. Similarly, A′, B′, etc., and A″, B″, etc. represent intervals of two succeeding cycles of operation. The letter N has been used to designate the fourth interval of a cycle to conform with the previously established notation wherein N represents the number of stages in the shift register. In the interest of clarity in the following description, the time interval designation will precede the pulse designation and time step subscript; for example, $At_1$ represents the occurrence of an unconditional advance pulse "*t*" in the first step of time interval A.

Reference now should be made to the table of Fig. 2 in combination with the schematic of Fig. 1. It will be assumed that prior to the start of the first subtract cycle pulse "*s*" had occurred and has subsequently been transferred to core 19 by an $m_{2'}$ pulse. Cores 10, 14 and 19 are in the "1" state, and cores 11, 12, 13, 15, 16, 17, 18 and 20 in the "0" state. Current pulse $At_1$ applied to terminal 35 of the modifying network divides unequally into a larger amplitude current $I_y$, and a smaller current $I_x$. This condition results from the impedance presented to current $I_x$ by the counter E.M.F. generated in winding 77 during the switching of core 19 from the "1" state to the "0" state. Core 16, already in the "0" state, offers only a slight impedance to current $I_y$. Due to the unbalance in the branch currents, core 20 is switched from the "0" state to the "1" state by current $I_y$ flowing through winding 86, and core 17 is driven further into the "0" state. Current $At_1$ also advances the information in the shift register so that at the end of $At_1$ time, cores 11, 15 and 20 are in the "1" state; cores 10, 12, 13, 14, 16, 17, 18 and 19, in the "0" state. Subsequently, $At_2$ pulse applied to winding 51 of core 20 switches the latter core from the "1" state to the "0" state, thereby inducing a voltage in output winding 75 which produces current flow in a path comprising input winding 74 of core 19, winding 75, diode 76, and input winding 63*a* coupled to core 10. In this manner cores 10 and 19 are switched to the "1" state. Pulse $At_2$ also advances the information in the register so that at the end of $At_2$ time there is a "1" in cores 10, 12, 16 and 19, and a "0" in cores 11, 13, 15, 17, 18 and 20.

In the next time interval, $Bt_1$ pulse applied to terminal 35 of the modifying network 45 divides equally into branch currents $I_x$ and $I_y$ since both input cores 16 and 19 are in the "1" state. These balanced currents allow cores 17 and 20 to remain in their respective "0" states. It should be apparent that if both input cores 16 and 19 had been in the "0" state at $Bt_1$ time, the same condition of balanced currents $I_x$ and $I_y$ would have prevailed and the remanent states of cores 17 and 20 would likewise have remained unchanged. Advance pulse $Bt_1$ also transfers a "1" from core 10 to core 11, and a "1" from core 12 to core 13.

At this point the subtraction performed by the modifying network on the number circulating in the register ceases, since the subtract pulse stored in core 19 has been destroyed by advance pulse $Bt_1$. The succeeding advance pulses starting with $Bt_2$ cause the new information to advance from core to core until at $Nt_2$ time, the binary number stored in the even numbered shift register cores is "1001," or "nine." It is to be noted that a count pulse was stored in core 18 at $Ct_1$ time. Coincident with $Nt_2$, conditional pulse $m_{2'}$ transfers the count pulse from core 18 to core 19, thereby conditioning the modifying network 45 to subtract "one" from the "nine" in the register during the second subtract cycle comprising intervals A' through N' inclusive. At $N't_2$ time, the number in the register is "1000," or eight. It should be further noted that a count pulse was stored in core 18 at $B't_1$ time and that at $N't_2$ time, pulse $m_{2'}$ is present to condition the modifying network.

The next subtract cycle comprises intervals A" to N" inclusive. The principles of operation of the counter circuit considered in connection with the first subtract cycle, apply as well to the present cycle. At $N''t_2$ the information in the register is "0111" or "seven." Since no subtract count pulse occurred during this cycle, the number "seven" will continue to circulate in the register until both an "*s*" count pulse and a subsequent $m_{2'}$ pulse are received by the counter.

The $t_1$ pulse immediately following the $m_{2'}$ pulse which transfers the tenth subtract pulse to core 19 of the modifying network, destroys the last "1" in the register by clearing core 16. The succeeding $t_2$ pulse flowing through winding 52 reads a "1" into core 22 of the sensing network 55. Whenever one or more odd-numbered shift register cores are being switched from the "1" state to the "0" state by a $t_2$ pulse applied to windings 50, current flows into the undotted terminal of winding 64 of core 21 and then through the transfer loop circuits coupling said latter odd-numbered cores to the succeeding even-numbered cores. In this manner core 21 is switched to the "1" state at $t_2$ time. Since in the present situation there are all zeros in the shift register at $t_2$ time, no current will flow through winding 64 when the odd-numbered register cores are interrogated and core 21 remains in the "0" state.

The presence of a binary "1" in core 21 at interrogation time $t_1$ will inhibit the transfer of the "1" stored in core 22 to the output core 23. Conversely, the absence of a binary "1" in core 21 results in the switching of core 23 to the "1" state. In the former case where both input cores 21 and 22 are in their respective "1" states, interrogation current $t_1$ applied to terminal 36 will divide equally into branch currents $I_m$ and $I_n$, since the switching impedances presented to the branch currents are substantially equal. The magnetomotive forces applied to output core 23 by currents $I_m$ and $I_n$ flowing respectively through windings 98 and 99 are equal and opposite so that core 23 remains in the "0" remanent state.

In the present situation where core 21 is in the "0" state and core 22 in the "1" state at $t_1$ time, current $I_n$ will be impeded by the counter E.M.F. generated in winding 92 during the switching of core 22 to the "0" state, and current $I_m$ will be substantially larger than $I_n$. Current $I_m$ flowing through winding 98 switches core 23 to the "1" state. The succeeding $t_2$ pulse applied to winding 53 of core 23 switches core 23 to the "0" state, thereby developing an output voltage across winding 65. This output voltage is transferred via diode 66 to the utilization device 90. The winding 65 may be connected to the input windings of certain of the shift register cores as well as to the utilization device in order to reset the shift register cores to any predetermined number.

In accordance with the mode of operation of the sensing circuit 55, as hereinbefore described, output core 23 will deliver a pulse to the utilization device at the start of the counting cycle during the first $t_2$ time following the presetting of the binary number in the shift register. This extraneous output pulse is desirable in some applications as a start indication. However, if the pulse is objectionable, it can be eliminated by placing an additional input winding on core 21 and presetting a "1" in said latter core prior to, or at the same time as, the presetting of the binary number in the shift register.

From the foregoing description of the invention it is evident that the instant counter provides a versatile, efficient and economical circuit having general utility in a variety of applications.

It must be understood that while a preferred embodiment of the counter has been shown in Fig. 1, this embodiment is meant to be illustrative only, and is not limitative of the invention. The shift register 25 is a conventional type utilizing two storage elements per bit of binary information. To effect an even greater saving in the number of magnetic elements required, a shift register employing less than two storage elements per bit, such as the conventional one storage element per bit register, may be employed.

Many modifications will be suggested to those skilled in the art, and all such variations as are in accordance with the principles discussed previously are meant to fall within the scope of the appended claims.

What is claimed is:

1. An electronic counter comprising a serial shift register having a plurality of magnetic elements each capable of assuming bistable states of magnetic remanence and adapted to receive and store a binary number in the form of "1's" and "0's," a logic network comprising a plurality of magnetic elements each having a substantially square loop hysteresis characteristic, said logic network having at least one magnetic element in common with said shift register elements and forming with said shift register a closed loop, means for circulating said binary number in said closed loop, said logic network being adapted to receive and store count pulses from an external source, the occurrence of each of said count pulses conditioning said logic network for deriving the complements of the digits of said binary number commencing with the least significant digit, proceeding with successively more significant digits, and terminating with, but including, the first digit which has a binary value of "1," said binary number being decreased in value by one for each occurrence of said count pulses, the absence of said count pulses allowing said binary number to circulate unaltered, the value of the binary number circulating in said loop at any specified time being equal to the original value of the binary number preset in said shift register elements minus the total number of count pulses which have occurred since said presetting, means coupled to said shift register magnetic elements for sensing the presence of a predetermined binary number therein, and means for generating an output pulse indicative of the occurrence of the number of count pulses needed to alter said binary number from its original value to said predetermined value.

2. An electronic counter comprising a serial shift register having a plurality of magnetic cores each having bistable states of magnetic remanence and adapted to receive and store bits of information representative of a binary number, a logic circuit comprising first and second input cores and first and second output cores each capable of assuming bistable states of magnetic remanence, said logic circuit being coupled to said shift register and forming therewith a closed loop, means for circulating said binary number in said closed loop, said first input core being adapted to receive the successive bits of information circulating in said loop, said second input core being adapted to receive count pulses from an external source, the absence of said count pulse in said second input core allowing said circulation means to transfer the binary information in said first input core to said first output core and subsequently to a first of said shift register cores, the presence of said count pulse in said second input core conditioning said logic circuit whereby the complement of the binary information stored in said first input core is transferred to said second output core, said complementing action commencing with the presence in said first input core of the least significant digit of said binary number and terminating with, but including, the first digit of said binary number which causes said first input core to assume the same magnetic remanent state as that to which said second input core is switched by said count pulses, said logic circuit subtracting one from the number circulating in said loop for each occurrence of said count pulses, the value of the binary number circulating in said loop at any specified time being equal to the original value of the binary number preset in said shift register minus the total number of count pulses which have occurred since said presetting, means coupled to said shift register cores for sensing the presence of a preselected binary number therein, and means for generating an output pulse indicative of the occurrence of the number of count pulses required by said logic circuit to alter said binary number from its original value to said preselected value.

3. An electronic counter comprising a serial shift register having a plurality of magnetic cores each having bistable states of magnetic remanence and adapted to receive and store bits of information representative of a binary number, a logic circuit comprising first and second input cores and first and second output cores each capable of assuming bistable states of magnetic remanence, said logic circuit being coupled to said shift register and forming therewith a closed loop, means for circulating said binary number in said closed loop, said first input core being adapted to receive the successive bits of information circulating in said loop, said second input core being adapted to receive count pulses from an external source, an interrogation winding coupled to each of said logic circuit cores, a pair of input windings coupled to each of said output cores, the interrogation winding on each of said input cores being coupled in series to one of said input windings on each of said output cores in one of two parallel current paths, means for simultaneously transmitting interrogating current in the same direction through said two paths to apply switching current to each of said input cores, the simultaneous switching of neither or both of said input cores by said interrogating current resulting in equal currents flowing in said parallel paths, the original magnetic remanent state of said output cores remaining unchanged in the presence of said equal currents, the switching of either of said input cores, but not both, in response to said interrogating current resulting in a diminution of current flow in the path in which said switching input core is situated and an increase in current in the other of said paths, such unequal currents flowing through said input windings coupled to said output cores resulting in the switching of either said first or second output cores in response to the respective switching of either said first or second input cores, means for reading out the information stored in said output cores, an output winding coupled to each of said output cores, means coupling said output winding on said first output core to a first of said shift register cores whereby the information derived from the switching of said first output core by said read-out means is transferred to said first shift register core, means coupling said output winding on said second output core to said first shift register core and also to said second input logic circuit core whereby the information derived from the switching of said second output core by said read-out means is simultaneously transferred to both said first shift register core and said second input core, the value of the binary number circulating in said loop at any specified time being equal to the original value of the binary number preset in said shift register minus the total number of count pulses which have been received by said second input element since said presetting, means coupled to said shift register magnetic cores for sensing the presence of a predetermined binary number therein, and means for generating an output pulse indicative of the occurrence of the number of count pulses required to cause said logic circuit to alter said binary number from its original value to said predetermined value.

4. A counter circuit as defined in claim 3 wherein said first input and output cores are common to both said logic circuit and said serial shift register.

5. An electronic counter comprising a serial shift register having a plurality of magnetic elements each having bistable states of magnetic remanence and adapted to receive and store a binary number in the form of "1's" and "0's", a logic network comprising a plurality of magnetic elements each having a substantially square-loop hysteresis characteristic, said logic network having at least one magnetic element in common with said shift register elements and forming with said shift register a closed loop, means for transferring the bits of said binary number from one element to another within said loop, said logic circuit being adapted to receive and store count pulses from an external source, the occurrence of each of said count pulses conditioning said logic network to subtract one from the binary number circulating in said loop, the absence of said count pulses allowing said binary number to pass unaltered through said logic network, the value of the binary number circulating in said loop at any specified time being equal to the original value of the binary number preset in said shift register minus the total number of count pulses which have occurred since said presetting, sensing means for determining when said original binary number has been counted-down to zero, said sensing means comprising first and second input magnetic elements and an output magnetic element each capable of assuming bistable states of magnetic remanence, an input winding and an interrogation winding coupled to each of said input elements, means for presetting said first input element to a preselected stable state, means coupling said input winding of said second input element to a plurality of said shift register elements, the transfer of a binary "1" from one magnetic element to another in said shift register producing current flow in said latter input winding whereby said second input element is switched to the same remanent state as said preselected state of said first input element, the transfer of a binary number of zero value in said shift register producing no current flow through said input winding on said second input element; two input windings, an interrogation winding and an output winding coupled to said output element; the interrogation winding on each of said input elements being coupled in series to one of said input windings on said output element in one of two parallel paths, means for simultaneously transmitting interrogating current in the same direction through said current paths to apply switching current to each of said input elements, said input windings being coupled to said output element in such polarity that said interrogating current flowing respectively therethrough tends to establish opposite states of magnetic remanence in said output element, the switching of both said input elements by said interrogating current resulting in equal currents flowing in said parallel paths and allowing said output element to remain in its original stable state, the exclusive switching of said first input element from its preselected stable state to its other stable state by said interrogating current resulting in a diminution of current flow in one of said parallel paths and an increase in current in the other of said paths, such inequality of currents flowing through said input windings on said output core resulting in the switching of said latter element from its original stable state to its opposite stable state, means including said interrogation winding on said output element for sensing the magnetic state of said latter element, the switching of said output element from said opposite stable state to its original stable state generating an output pulse in said output winding coupled thereto, said output pulse being indicative of the occurrence of a number of count pulses equal to the binary number originally preset in said shift register.

6. An electronic counter as defined in claim 5 wherein said logic network comprises first and second input elements and first and second output elements each capable of assuming bistable states of magnetic remanence, said first logic input element being adapted to receive the successive bits of said binary number circulating in said loop, said second logic input element being adapted to receive count pulses from an external source, an interrogation winding coupled to each of said logic circuit elements, a pair of input windings coupled to each of said logic output elements, the interrogation winding on each of said logic input elements being coupled in series to one of said input windings on each of said logic output elements in one of two parallel current paths, means for simultaneously transmitting interrogating current in the same direction through said two paths to apply switching current to each of said logic input elements, the switching of either of said logic elements, but not both, in response to the interrogating current applied thereto resulting in a diminution of current flow in the path in which said switching logic input element is situated and an increase in current in the other of said paths, such unequal currents flowing through said input windings coupled to said logic output elements resulting in the switching of either said first or second logic output element in response to the respective switching of either said first or second logic input element, means including said interrogation windings on said logic output elements for reading out the binary information stored in each of said latter elements, an output winding coupled to each of said logic output elements, means coupling said output winding on said first logic output element to a first of said shift register elements whereby the binary information derived from said first logic output element by said read-out means is transferred to said first shift register element, and means coupling said output winding on said second logic output element to said first shift register element and also to said second logic input element whereby the information derived from the switching of said second logic output element by said read-out means is simultaneously transferred to both said first shift register element and to said second logic input element.

References Cited in the file of this patent

UNITED STATES PATENTS

| | | |
|---|---|---|
| 2,500,294 | Phelps | Mar. 14, 1950 |
| 2,652,501 | Wilson | Sept. 15, 1953 |
| 2,856,595 | Selmer | Oct. 14, 1958 |